United States Patent
Chedrawy et al.

(10) Patent No.: US 9,793,630 B2
(45) Date of Patent: Oct. 17, 2017

(54) MODIFICATION OF IRIDIUM 9603 / 9603N SBD TRANSCEIVER BY REPLACING SAMTEC ST4-10-2.50L-D-P-TR USER CONNECTOR WITH MOLEX 501591-2011 USER CONNECTION

(71) Applicant: MetOcean Data Systems Limited, Dartmouth (CA)

(72) Inventors: Anthony Chedrawy, Dartmouth (CA); Vincent Wilson, Beaverbank (CA); Danny Garon, Lower Sackville (CA); Paul Brooks, Halifax (CA)

(73) Assignee: METOCEAN TELEMATICS LIMITED (CA)

( * ) Notice: Subject to any disclaimer, the term of this patent is extended or adjusted under 35 U.S.C. 154(b) by 0 days.

(21) Appl. No.: 14/884,150

(22) Filed: Oct. 15, 2015

(65) Prior Publication Data
US 2017/0110813 A1 Apr. 20, 2017

(51) Int. Cl.
*H04B 1/40* (2015.01)
*H01R 12/62* (2011.01)
*H01R 24/66* (2011.01)
*H01R 43/20* (2006.01)
*H01R 107/00* (2006.01)

(52) U.S. Cl.
CPC .............. *H01R 12/62* (2013.01); *H01R 24/66* (2013.01); *H01R 43/205* (2013.01); *H04B 1/40* (2013.01); *H01R 2107/00* (2013.01)

(58) Field of Classification Search
None
See application file for complete search history.

(56) References Cited

U.S. PATENT DOCUMENTS

| | | | | |
|---|---|---|---|---|
| 2004/0246667 A1* | 12/2004 | Maskatia | .............. | G06F 1/1618 361/679.28 |
| 2008/0029580 A1* | 2/2008 | Fitzsimmons | ......... | B23K 1/018 228/101 |

OTHER PUBLICATIONS

Molex Part No. 501591-2011, Aug. 14, 2014, www.molex.com, pp. 1-2.*
Iridium 9603 Overview, May 11, 2012, Iridium Product Management, pp. 1-23.*
GT-IRDM-9603 Product Description, Jun. 17, 2014, Adaptive Modules, pp. 1-8.*

* cited by examiner

*Primary Examiner* — Alejandro Rivero
(74) *Attorney, Agent, or Firm* — Schmeiser, Olsen & Watts, LLP

(57) ABSTRACT

An Iridium 9603/9603N SBD Transceiver is provided. The improvement comprises a MOLEX 501591-2011 user connector replacing a SAMTEC ST4-10-2.50L-D-P-TR user connector. Furthermore, a method for replacing the SAMTEC ST4-10-2.50L-D-P-TR user connector of the Iridium 9603/9603N SBD Transceiver with the MOLEX 501591-2011 user connector is provided.

2 Claims, 8 Drawing Sheets

MODIFICATION OF IRIDIUM 9603 / 9603N SBD TRANSCEIVER BY REPLACING SAMTEC ST4-10-2.50L-D-P-TR USER CONNECTOR WITH MOLEX 501591-2011 USER CONNECTION

FIELD OF TECHNOLOGY

The following relates to transceivers, and more particularly, to an Iridium 9603/9603N SBD Transceiver having a SAMTEC ST4-10-2.50L-D-P-TR user connector replaced with a MOLEX 501591-2011 user connector and a method for replacing the user connector.

BACKGROUND

Present day applications of transceivers such as the Iridium 9603/9603N SBD Transceiver in, for example, tracking and locating, require the electronics enclosure to be as small as possible.

Unfortunately, the Iridium 9603/9603N SBD Transceiver is provided with a SAMTEC ST4-10-2.50L-D-P-TR user connector that sits proud of the Transceiver and requires a substantially large cable assembly for connecting to an antenna-Printed Circuit Board (PCB) assembly, thus requiring a substantial volume for accommodating the SAMTEC ST4-10-2.50L-D-P-TR user connector and the cable assembly.

Typical manufacturing processes for installing the transceiver such as the Iridium 9603/9603N SBD Transceiver into a product involves several tests of the transceiver on its own and together with in the product electronics. This involves the repetitive connecting and disconnecting of the transceiver from the product electronics. The SAMTEC ST4-10-2.50L-D-P-TR connector has proven to be fragile in such manufacturing circumstances and has broken off of the PCB at an unacceptable rate, wasting the unit in test and causing a significant time loss during the manufacturing process.

Unfortunately, the user connector's footprint and pin pattern is not standardized, making it unlikely to find two different brand user connectors with an interchangeable footprint and pin pattern.

It is desirable to provide an Iridium 9603/9603N SBD Transceiver having a user connector that is substantially smaller than the SAMTEC ST4-10-2.50L-D-P-TR user connector.

It is also desirable to provide an Iridium 9603/9603N SBD Transceiver having a user connector that is substantially more durable than the SAMTEC ST4-10-2.50L-D-P-TR user connector.

It is also desirable to provide a method for changing the SAMTEC ST4-10-2.50L-D-P-TR user connector of an Iridium 9603/9603N SBD Transceiver.

It is also desirable to provide a flexible cable assembly for connecting the Iridium 9603/9603N SBD Transceiver to a PCB that has a low profile and allows for some misalignment therebetween.

SUMMARY

An aspect relates to an Iridium 9603/9603N SBD Transceiver having a user connector that is substantially smaller than the SAMTEC ST4-10-2.50L-D-P-TR user connector.

Another aspect is to provide an Iridium 9603/9603N SBD Transceiver having a user connector that is substantially more durable than the SAMTEC ST4-10-2.50L-D-P-TR user connector.

Another aspect is to provide a method for changing the SAMTEC ST4-10-2.50L-D-P-TR user connector of an Iridium 9603/9603N SBD Transceiver.

A further aspect is to provide a flexible cable assembly for connecting the Iridium 9603/9603N SBD Transceiver to a PCB that has a low profile and allows for some misalignment therebetween.

According to embodiments of the present invention, there is provided an Iridium 9603/9603N SBD Transceiver wherein the improvement comprises a MOLEX 501591-2011 user connector replacing a SAMTEC ST4-10-2.50L-D-P-TR user connector.

According to embodiments of the present invention, there is provided a method for changing the SAMTEC ST4-10-2.50L-D-P-TR user connector of an Iridium 9603/9603N SBD Transceiver. The Iridium 9603/9603N SBD Transceiver is pre-heated to a predetermined temperature. Then the SAMTEC ST4-10-2.50L-D-P-TR user connector is exposed to a stream of hot air and lifted from the PCB of the Iridium 9603/9603N SBD Transceiver. The PCB of the Iridium 9603/9603N SBD Transceiver is then cleaned where the SAMTEC ST4-10-2.50L-D-P-TR user connector has been removed. A MOLEX 501591-2011 user connector is placed onto the area of the PCB of the Iridium 9603/9603N SBD Transceiver where the SAMTEC ST4-10-2.50L-D-P-TR user connector has been removed while the Iridium 9603/9603N SBD Transceiver is still warm. Pins of the MOLEX 501591-2011 user connector are then soldered to respective connecting pads of the PCB of the Iridium 9603/9603N SBD Transceiver.

According to embodiments of the present invention, there is provided a transceiver wherein the improvement comprises a MOLEX 501591-2011 user connector replacing a SAMTEC ST4-10-2.50L-D-P-TR user connector.

According to embodiments of the present invention, there is provided a flexible cable assembly. The flexible cable assembly comprises a thin U-shaped flexible plastic sheet having a first U-section, a second U-section and a connecting section connecting the first U-section and the second U-section. A plurality of U-shaped electrical conducting traces is disposed on at least one surface of the U-shaped flexible plastic sheet. A first connector is disposed on an end portion of the first U-section and a second connector is disposed on an end portion of the second U-section, wherein each pin of a plurality of pins of the first connector is connected to a respective pin of the second connector via one of the U-shaped electrical conducting traces. The U-shaped flexible plastic sheet is bent such that a top surface thereof at the end portions of the U-sections and at the connecting section faces in opposite direction.

The advantage of embodiments of the present invention is that it provides an Iridium 9603/9603N SBD Transceiver having a user connector that is substantially smaller than the SAMTEC ST4-10-2.50L-D-P-TR user connector.

A further advantage of embodiments of the present invention is that it provides an Iridium 9603/9603N SBD Transceiver having a user connector that is substantially more durable than the SAMTEC ST4-10-2.50L-D-P-TR user connector.

A further advantage of embodiments of the present invention is that it provides a method for changing the SAMTEC ST4-10-2.50L-D-P-TR user connector of an Iridium 9603/9603N SBD Transceiver.

A further advantage of embodiments of the present invention is that it provides a flexible cable assembly for connecting the Iridium 9603/9603N SBD Transceiver to a PCB that has a low profile and allows for some misalignment therebetween.

BRIEF DESCRIPTION

Some of the embodiments will be described in detail, with reference to the following figures, wherein like designations denote like members, wherein.

DETAILED DESCRIPTION

Unless defined otherwise, all technical and scientific terms used herein have the same meaning as commonly understood by one of ordinary skill in the art to which embodiments of the invention belongs. Although any methods and materials similar or equivalent to those described herein can be used in the practice or testing of embodiments of the present invention, the preferred methods and materials are now described.

While the description of the preferred embodiments hereinbelow is with reference to an Iridium 9603/9603N SBD Transceiver, it will become evident to those skilled in the art that the embodiments of the invention are not limited thereto, but are adaptable for other transceivers having a SAMTEC ST4-10-2.50L-D-P-TR user connector.

Figure 1A:
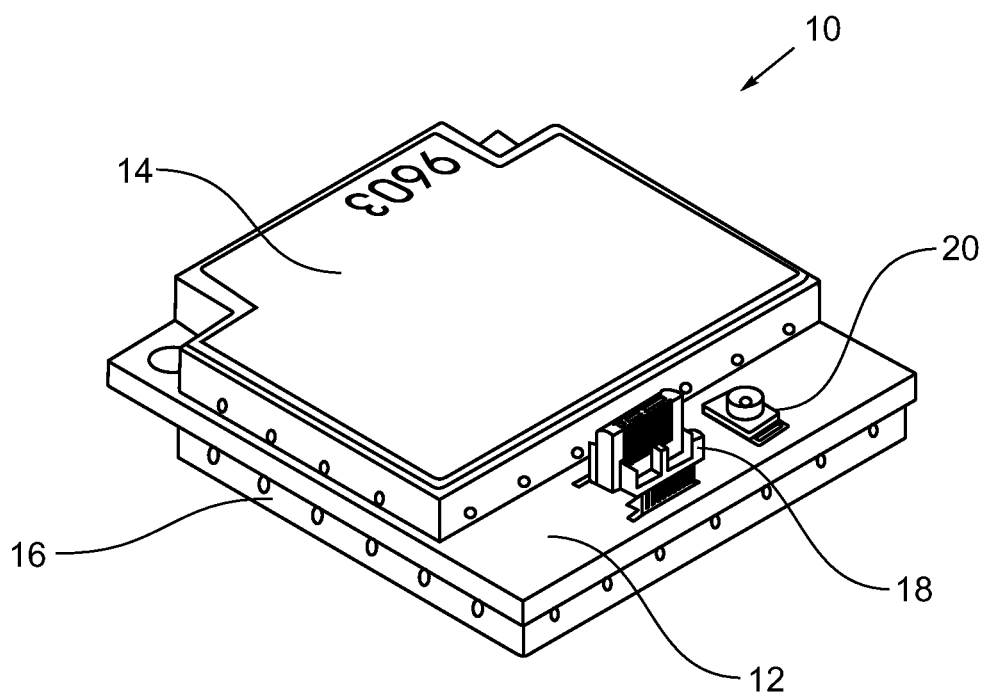
FIGS. 1a to 1d are simplified block diagrams illustrating in a perspective top view, a bottom view, a top view, and a side view, respectively, a commercially available an Iridium 9603/9603N SBD Transceiver.
Figure 1B:
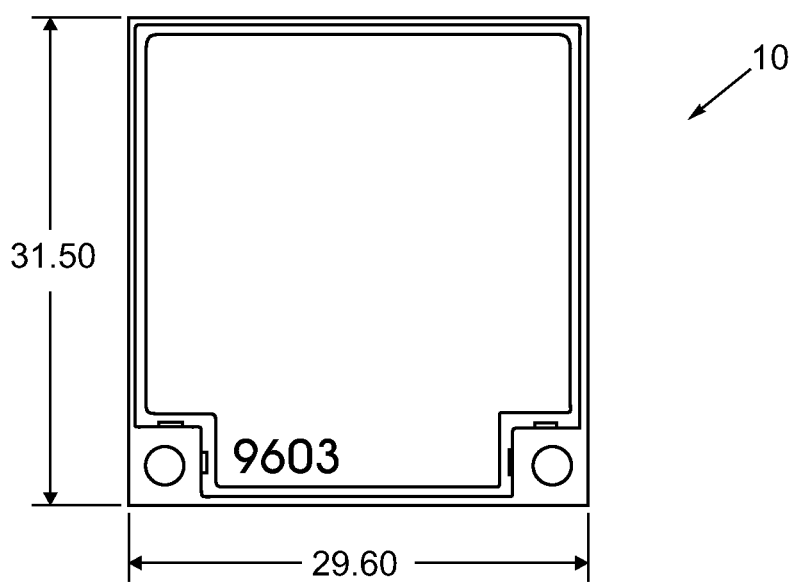
Figure 1C:
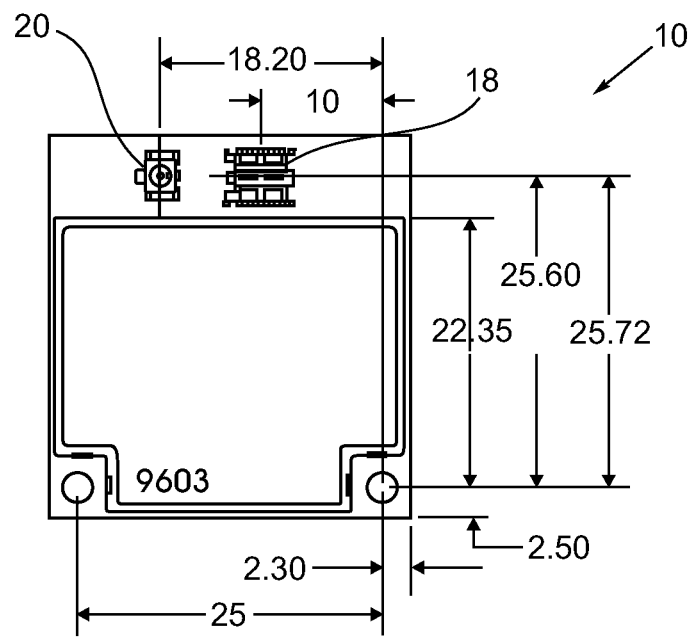
Figure 1D:
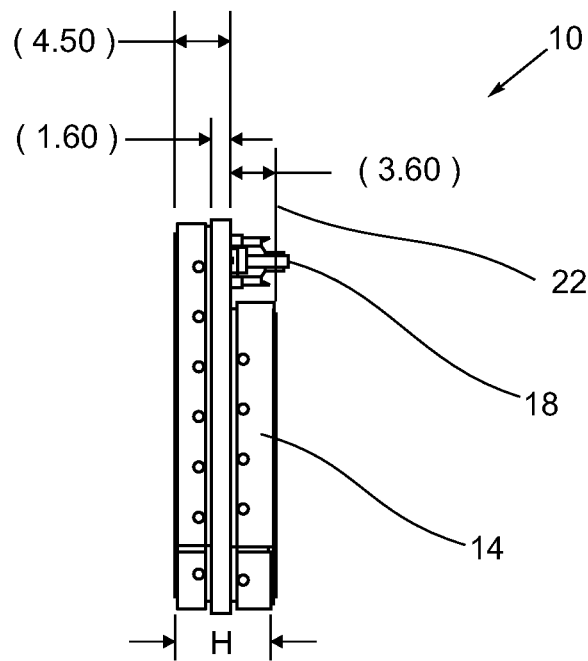

FIGS. 1a to 1d illustrate various views of a commercially available Iridium 9603/9603N SBD Transceiver 10 with dimensions in mm. The electronic components of the Iridium 9603/9603N SBD Transceiver 10 are disposed in metal shielding housings 14 and 16 mounted to a PCB 12. Two electrical interfaces—a multiway user connector 18 and an RF antenna connector 20—are mounted to one end of the PCB 12. The user connector 18 provides the following connections to the Transceiver 10: DC power supply input; power on/off control; serial data interface; network available output; and, supply power indicator output. The user connector 18 is surface mount, 0.4 mm centerline terminal strip. Individual pin assignments—20 pins—and limits for the digital signals are provided to customers in the manufacturers Product Developers Guide. As illustrated in FIGS. 1a, 1c and 1d, the Transceiver 10 is provided with a surface mounted SAMTEC ST4-10-2.50L-D-P-TR user connector 18. As illustrated in FIG. 1d, the SAMTEC ST4-10-2.50L-D-P-TR user connector 18 clearly sits proud of the top surface 22 of the housing 14, thus requiring a substantial volume for accommodating the SAMTEC ST4-10-2.50L-D-P-TR user connector 18 and a cable assembly connected thereto.

As illustrated in FIGS. 1c and 1d, other components such as the RF connector 20 and the shielding housing 14 are in close proximity to the user connector 18, as well as the opposite side of the PCB 12 where the user connector 18 is placed is covered by shielding housing 16.

Since the user connector's 18 footprint and pin pattern is not standardized, finding two different brand user connectors with an interchangeable footprint and pin pattern is highly unlikely. Contrary to this fact, after extensive search a replacement user connector having a same footprint and pin pattern has been found in the MOLEX 501591-2011 user connector.

Figure 2A:
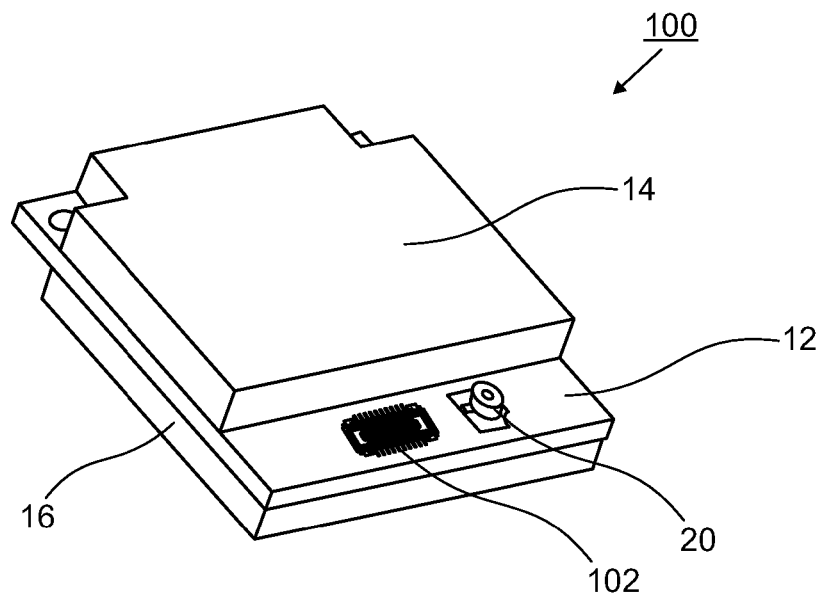
FIGS. 2a to 2c are simplified block diagrams illustrating in a perspective top view, a top view, and a detail top view, respectively, the Iridium 9603/9603N SBD Transceiver with a MOLEX 501591-2011 user connector according to a preferred embodiment of the invention.
Figure 2B:
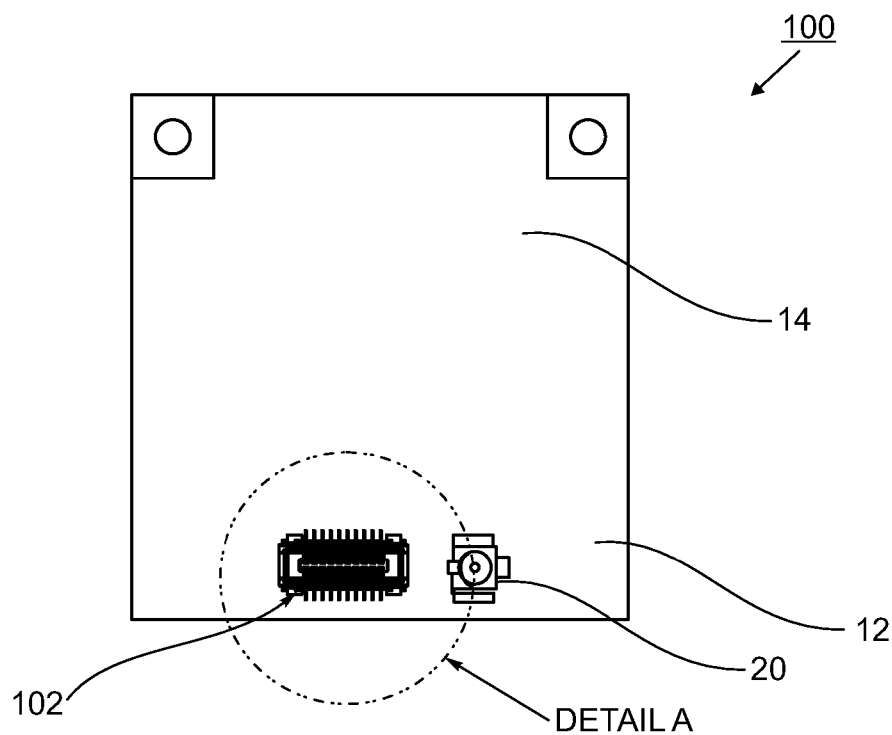
Figure 2C:
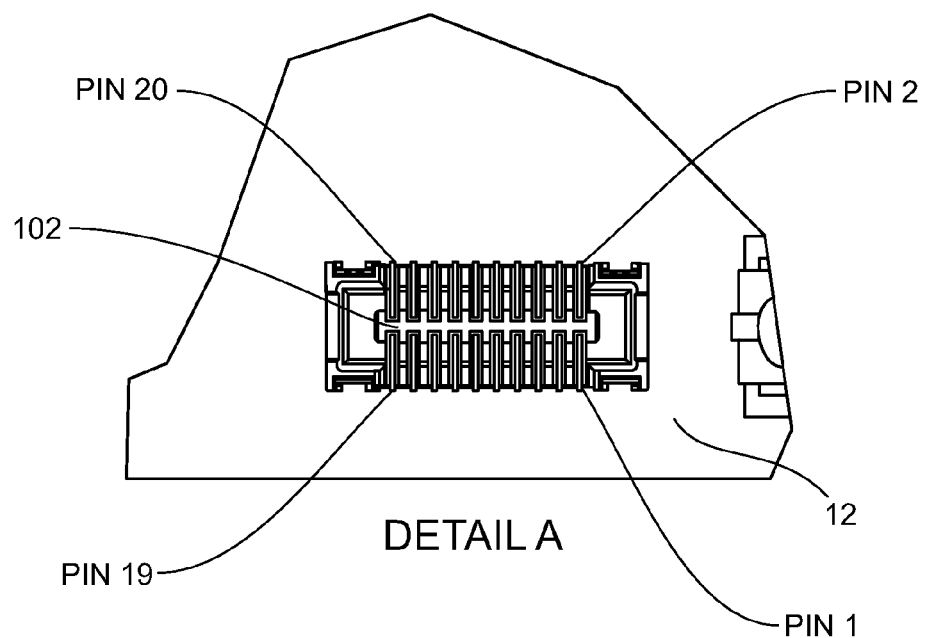

Referring to FIGS. 2a to 2c, an Iridium 9603/9603N SBD Transceiver 100 having a MOLEX 501591-2011 user connector 102 replacing the SAMTEC ST4-10-2.50L-D-P-TR user connector 18 according to a preferred embodiment of the invention is provided. The MOLEX 501591-2011 user connector 102 fits on the limited area on the PCB 12 between the shielding housing 14 and the RF connector 20 and has the same footprint and pin pattern—20 pins—as the SAMTEC ST4-10-2.50L-D-P-TR user connector 18. The MOLEX 501591-2011 user connector 102 has a substantially lower profile enabling mating with a respective connector such that the same does not extend the top surface of the shielding housing 14, as will be described hereinbelow. Furthermore, the MOLEX 501591-2011 user connector 102 is substantially more durable than the SAMTEC ST4-10-2.50L-D-P-TR user connector 18 enabling repetitive connecting and disconnecting without the risk of breaking.

To remove the SAMTEC ST4-10-2.50L-D-P-TR user connector 18 from the Iridium 9603/9603N SBD Transceiver 10, the Iridium 9603/9603N SBD Transceiver 10 is first pre-heated to a temperature between 150° C. and 200° C. using, for example, a hot plate such as an IR hot plate. Then the SAMTEC ST4-10-2.50L-D-P-TR user connector 18 is exposed to a stream of hot air at a temperature in the range between 200° C. and 400° C., preferably, about 300° C. After exposure to the stream of hot air, the SAMTEC ST4-10-2.50L-D-P-TR user connector 18 is lifted from the PCB 12 using, for example, tweezers. The area on the PCB 12 where the SAMTEC ST4-10-2.50L-D-P-TR user connector 18 has been removed is then cleaned with solder wick and a soldering iron. The MOLEX 501591-2011 user connector 102 is then placed onto the cleaned area, preferably, while the Iridium 9603/9603N SBD Transceiver 10 is still warm, and the pins of the MOLEX 501591-2011 user connector 102 are soldered to respective connecting pads of the PCB 12. Optionally, solderpaste and/or IR heat is applied.

Figure 3A:
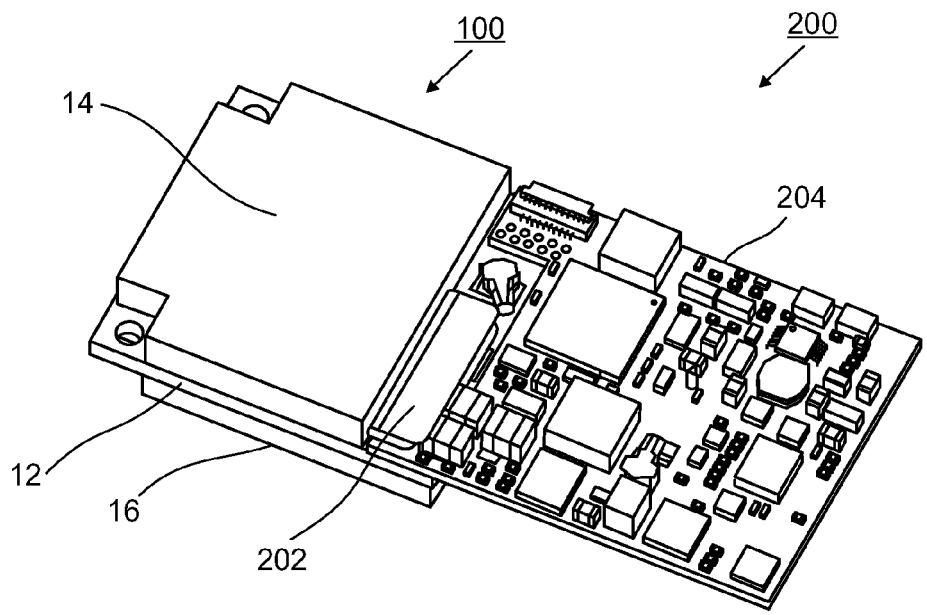
FIGS. 3a and 3b are simplified block diagrams illustrating in a perspective top view, and a side view, respectively, the Iridium 9603/9603N SBD Transceiver with a MOLEX 501591-2011 user connector according to a preferred embodiment of the invention connected to an antenna-PCB assembly.
Figure 3B:
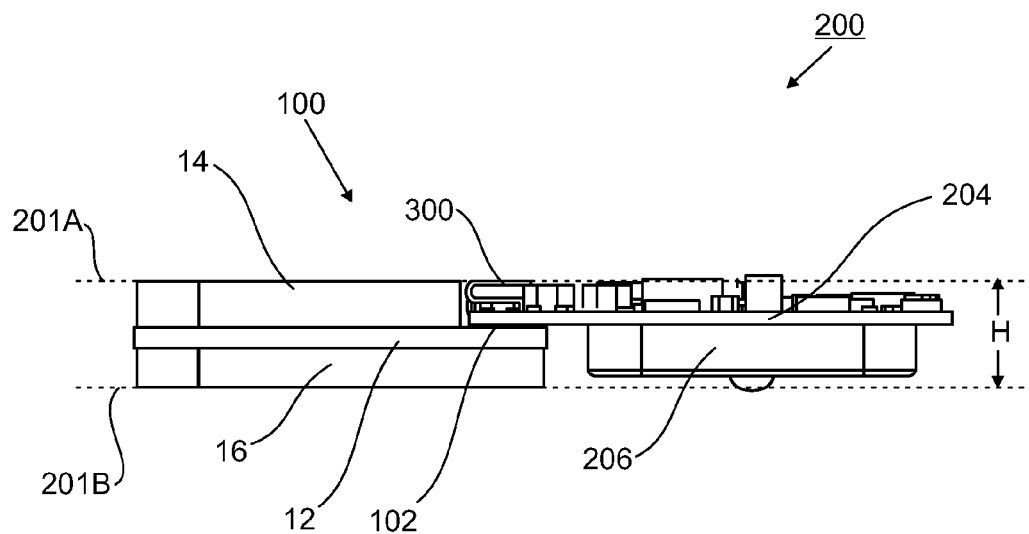
Figure 3C:
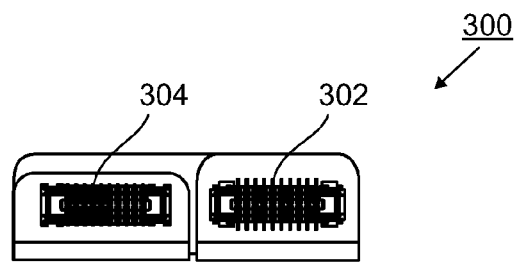
FIGS. 3c to 3e are simplified block diagrams illustrating in a bottom view, a side view, and a perspective bottom view, respectively, a flexible cable assembly for connecting the MOLEX 501591-2011 user connector of the Iridium 9603/9603N SBD Transceiver according to a preferred embodiment of the invention to the antenna-PCB assembly.
Figure 3D:
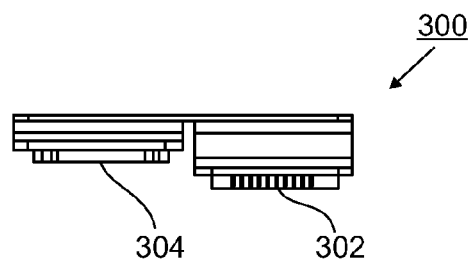
Figure 3E:
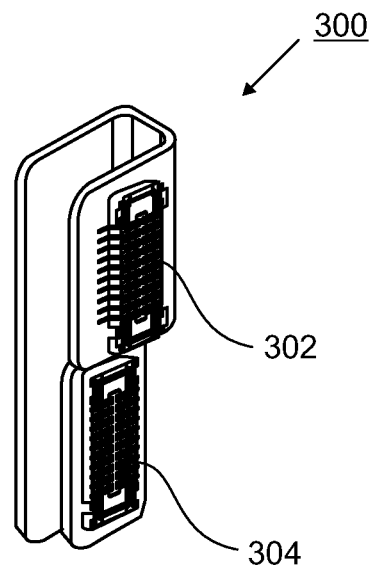

Referring to FIGS. 3a to 3e, an assembly 200 comprising the modified Iridium 9603/9603N SBD Transceiver 100 connected to an antenna-PCB assembly 204, 206 according to a preferred embodiment of the invention is provided. The antenna-PCB assembly 204, 206 comprises a commercially available antenna 206 mounted to a conventionally designed and manufactured control PCB 204 having various control components such as, for example, a microprocessor and GPS. The modified Iridium 9603/9603N SBD Transceiver 100 is connected to the antenna-PCB assembly 204, 206 via low profile flexible cable assembly 300 according to another preferred embodiment of the invention. Connector 302 of the low profile flexible cable assembly 300, as illustrated in FIGS. 3c to 3e, is mated with the MOLEX 501591-2011 user connector 102, while connector 304 of the low profile flexible cable assembly 300 is mated with a respective connector disposed on the PCB 204. The assembly 200 with the Iridium 9603/9603N SBD Transceiver 100 connected to the antenna-PCB assembly with antenna housing 206 and PCB 204 via the low profile flexible cable assembly 300 is disposed between parallel planes 201A and 201B having a same height H as the Iridium 9603/9603N SBD Transceiver 100. The low profile flexible cable assembly 300 enables the low profile connection illustrated in FIG. 3b while also allowing some misalignment between the modified Iridium 9603/9603N SBD Transceiver 100 and the antenna-PCB assembly 204, 206.

Figure 4A:
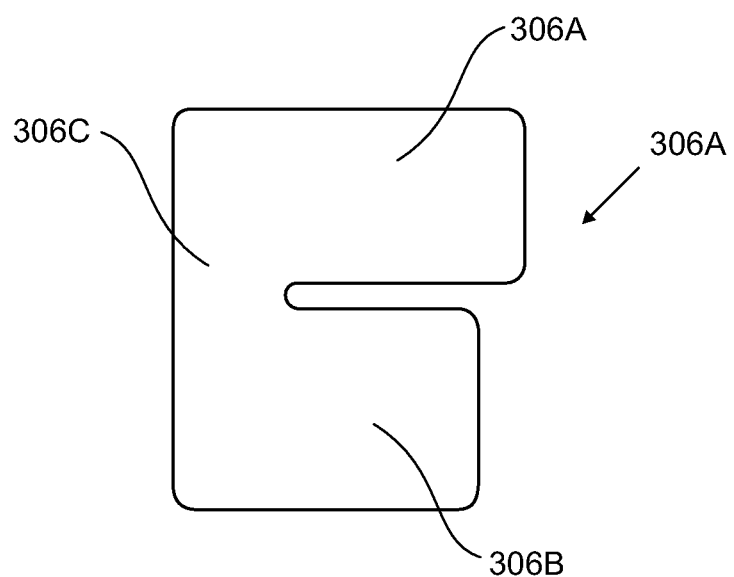
FIG. 4a is a simplified block diagram illustrating in a bottom view a U-shaped base of a low profile flexible cable assembly according to another embodiment of the invention for use with the assembly illustrated in FIGS. 3a and 3b.
Figure 4B:
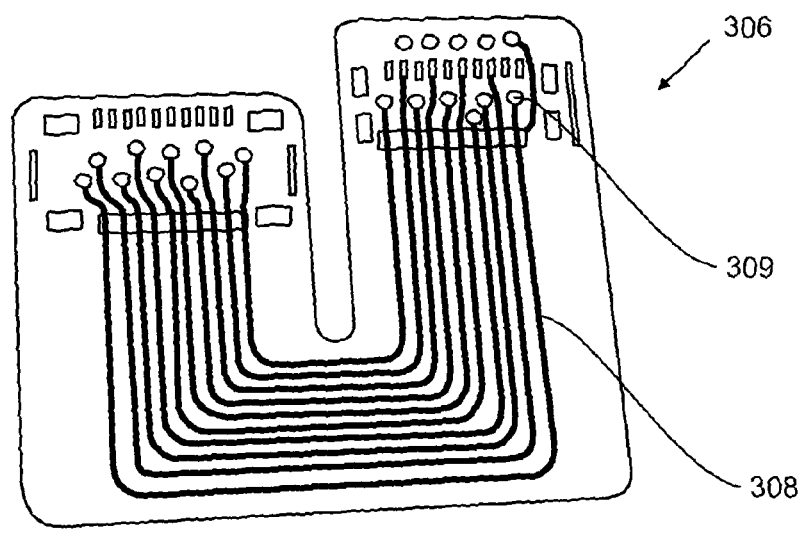
FIG. 4b is a simplified block diagram illustrating electrical conducting traces etched into one side of the U-shaped base of a low profile flexible cable assembly according to the other embodiment of the invention.
Figure 4C:
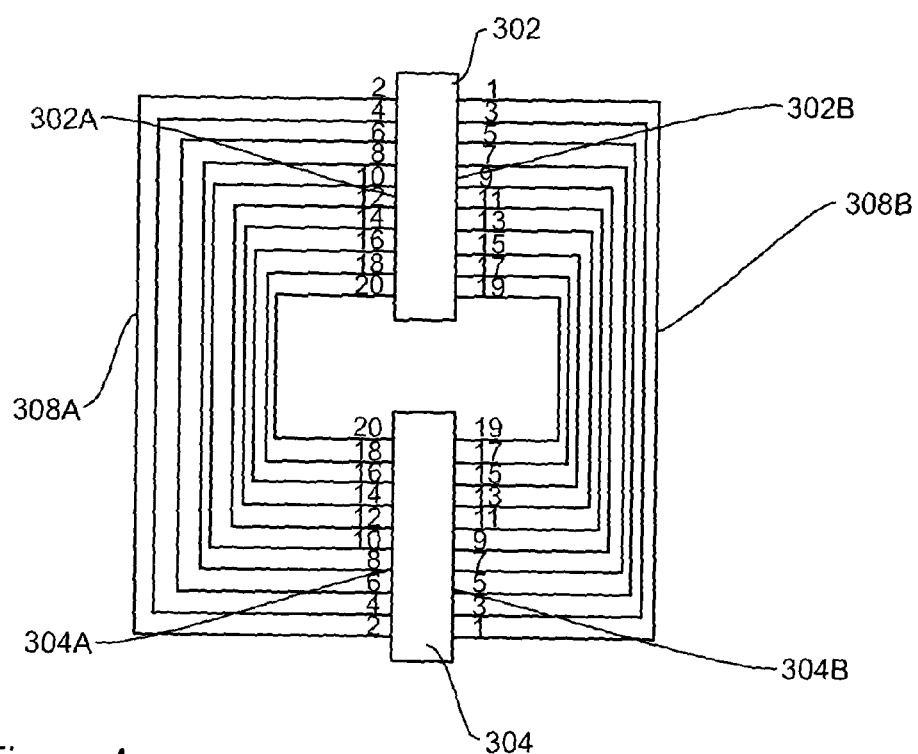
FIG. 4c is a simplified block diagram illustrating electrical conducting traces connecting the respective pins of the two connectors of the low profile flexible cable assembly according to the other embodiment of the invention; and, FIGS. 4d and 4e are simplified block diagrams illustrating top views of the low profile flexible cable assembly according to the other embodiment of the invention.
Figure 4D:
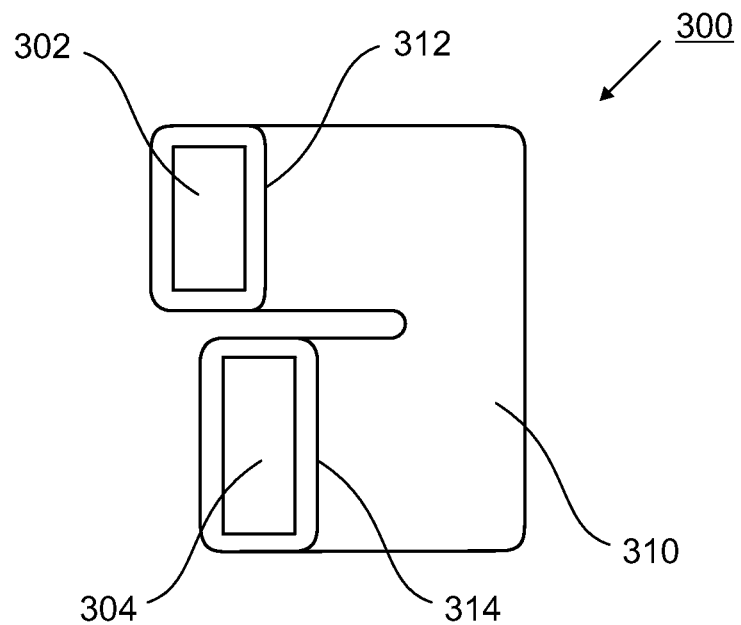
Figure 4E:
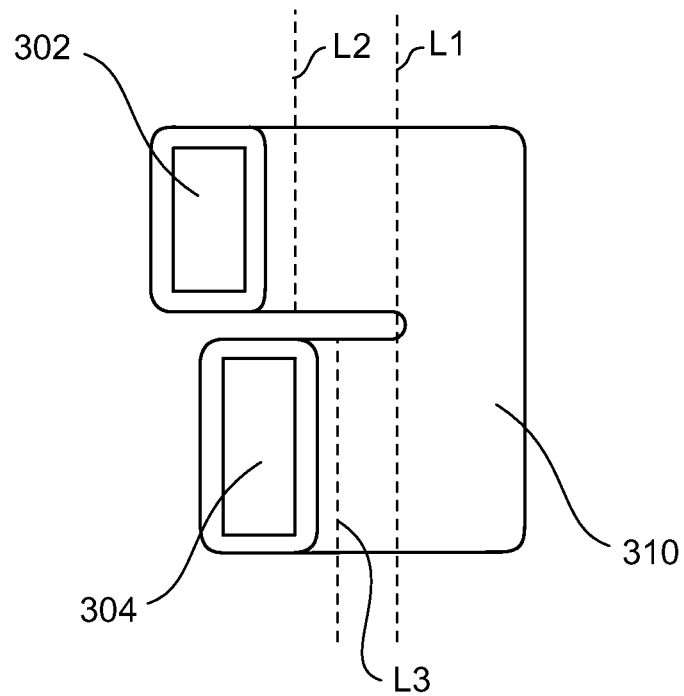

Referring to FIGS. 4a to 4e, the low profile flexible cable assembly 300 according to the other preferred embodiment of the invention is provided. The low profile flexible cable assembly 300 is made of a thin flexible plastic sheet material having disposed on both sides thereof a layer of an electrical conducting material, preferably, a commercially available PolyImide (PI) sheet material having disposed on both sides thereof a one ounce/sqft copper layer. As illustrated in FIG. 4a, the cable assembly 300 is made of a U-shaped base 306 having U sections 306A, 306B and connecting section 306C stamped out from the sheet material in a conventional manner after etching of electrical conducting traces. Using a standard etching process the electrical conducting traces 308 and connecting pads 309 are etched into the copper layers, as illustrated in FIG. 4b. Preferably, the traces 308 are U-shaped and disposed such that (even numbered) pins disposed on sides 302A, 304A of the connectors 302, 304 are connected by traces 308A disposed on a top side of the base 306 while (odd numbered) pins disposed on sides 302B, 304B of the connectors 302, 304 are connected by traces 308B disposed on a bottom side of the base 306, as illustrated in FIG. 4c. A thin flexible electrical insulating cover layer made of, for example, PI sheet material, is then glued onto the top and the bottom side of the base 306 using, for example, a PI based adhesive. Substantially rigid pads 312, 314 made of, for example, FR4 grade glass-reinforced epoxy laminate are thermally bonded onto respective end portions of the U sections 306A, 306B, as illustrated in FIG. 4d. Holes are then drilled to enable access to the connecting pads 309. The connectors 302, 304 are then placed onto the pads 312, 314 and soldered to the connecting pads in a conventional manner. Finally, the cable assembly 300 is bent approximately 90° about lines L1, L2, and L3, illustrated in FIG. 4e, to form the shape of the low profile flexible cable assembly 300 illustrated in FIG. 3e. As illustrated in FIGS. 3e and 4e, the low profile flexible cable assembly 300 is designed to accommodate placement of the connectors 302, 304 at different levels. The low profile flexible cable assembly 300 may also be provided for accommodating placement of the connectors 302, 304 at a same level with the U sections 306A, 306B having a same length the end portions thereof being bent about a same line. As is evident to those skilled in the art, the low profile flexible cable assembly 300 is not limited to the assembly 200, but may be adapted for use with various different connectors in different applications.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A transceiver assembly comprising:
    an Iridium 9603/9603N SBD transceiver having a MOLEX 501591-2011 user connector;
    a flexible cable assembly mated with the user connector; and
    an antenna mounted to a control PCB, the control PCB being mated with the flexible cable assembly;
    wherein the transceiver, the antenna mounted to the control PCB, and the flexible cable assembly are disposed between two parallel planes with the two parallel planes coinciding with a top surface and a bottom surface of the transceiver, respectively;
    wherein the flexible cable assembly is configured to allow for misalignment between the transceiver and the control PCB;
    wherein the transceiver comprises a PCB having the user connector mounted to an end portion thereof and wherein the end portion of the PCB overlaps with an end portion of the control PCB of the antenna.

2. The transceiver assembly according to claim 1, wherein the flexible cable assembly comprises:
    a U-shaped flexible plastic sheet having a first U-section, a second U-section and a connecting section connecting the first U-section and the second U-section;
    a plurality of U-shaped electrical conducting traces disposed on at least one surface of the U-shaped flexible plastic sheet;
    a first connector disposed on an end portion of the first U-section and a second connector disposed on an end portion of the second U-section, wherein each pin of a plurality of pins of the first connector is connected to a respective pin of the second connector via one of the U-shaped electrical conducting traces; and,
    wherein the U-shaped flexible plastic sheet is bent such that the first connector and the second connector are facing in a same direction and are oriented along a same line.

* * * * *